United States Patent [19]

Gray et al.

[11] 3,833,371
[45] Sept. 3, 1974

[54] FILM ANNOTATION METHOD

[76] Inventors: Charles R. Gray, 3104 Ramblewood Dr., District Heights, Md. 20028; DeForest D. Choha, 7809 Dassett Ct., Annandale, Va. 22003

[22] Filed: June 25, 1973

[21] Appl. No.: 373,324

[52] U.S. Cl. .................................... 95/1.1, 353/28
[51] Int. Cl. ......................................... G03b 17/24
[58] Field of Search .................. 95/1.1; 353/28, 44; 355/133

[56] References Cited
UNITED STATES PATENTS
2,553,285   5/1951   Thomas ................................ 355/37
3,473,451   10/1969   Greenly ................................ 95/1.1

*Primary Examiner*—John M. Horan
*Attorney, Agent, or Firm*—R. S. Sciascia; Arthur L. Branning; M. L. Crane

[57] ABSTRACT

A device to add additional information to previously processed photographic film. A layer of a Diazo emulsion is adhered onto one surface of the film which is then imaged onto a gloss screen where the desired annotations are made. An ultra-violet lamp then illuminates the annotations which are optically focussed back onto the Diazo emulsion. Given sufficient exposure the Diazo emulsion forms a latent image which is processed using gaseous ammonia.

5 Claims, 2 Drawing Figures

FILM ANNOTATION METHOD

BACKGROUND OF THE INVENTION

The present invention relates generally to the field of film information storage and more particularly to the annotation of previously processed film.

Those concerned with the storage of information on film have been trying for many years to devise a workable method for changing and adding new information to that stored on a particular piece of film. There are many difficulties associated with this problem, particularly when the film is small, such as microfilm or movie film. Photographic color films once exposed and processed may be retouched by adding pencil or crayon to increase the photographic density or by bleaching or chemical etching to decrease photographic density. However, the above technique does not permit large quantities of data, such as full pages of text, or fine line work to be added to existing film. Additionally, since microfilm is reduced by many factors the ability to add new information in small spaces is exceedingly difficult.

It is known to project an image of the film onto a photosensitive screen where a monochromatic light pencil is used to write the annotations. The image on the screen is then projected onto a new, unexposed film. This technique does not permit deletions nor does it permit the same processed film to be used again.

Another technique involves projecting the image of the film to be annotated onto a screen for convenience of viewing and then writing directly on the film by means of a scribe. The equipment needed for this method is very expensive and fragile. There is no way of restoring an annotated film back to its original condition.

One area in which a film annotation system is especially needed is in military aircraft devices; i.e., to add mission planning information and aircraft data, such as inflight fire, flameout and starting procedures, targets of opportunity, obstructions, flight tracks, timeticks, headings, fuel remaining, turning points, and other variable or changeable data, to the filmstrips used in cockpit navigation devices aboard military and commercial aircraft. The devices presently in use are not able to update or annotate existing films but must rely on annotated paper charts as back-up.

For example, the A7E/D aircraft utilizes a projected map display device (PMDS) which offers the pilot a positive indication of his position with reference to the ground below the aircraft. The PMDS is intended to furnish the pilot with a back projected moving map display of position and progress relative to the real world, and intelligence information of pertinent interest.

The basic cartographic and intelligence information incorporated into the film strip is subject to change for a number of reasons. Some of the changes would be periodic in nature and could change weekly or monthly. Other changes could include new intelligence information which could require a daily change. Therefore, a simple process, fully suitable for aboard ship and forward base implementation, is required to insure maximum mission effectiveness.

The present invention fulfills this requirement without incurring the problems prevalent in the prior art. New information may be added in any quantity desired, i.e., large or small quantities of information, such as pages or lines may be added on top of existing images or overlaid onto blank spaces on films such as microfilm, microfiche, movie film, filmstrips, viewgraphs, etc. Previously added information can be erased or changed easily and quickly without damage to the original piece of film.

SUMMARY OF THE INVENTION

The present invention involves the adhesion, onto one side of a conventional film strip, of a secondary emulsion which is transparent and insensitive to light in the visible spectrum but which is sensitive to certain radiation outside of the visible spectrum, such as ultraviolet (UV) light. The film, after having been exposed and processed, and with the emulsion adhered to it, is placed in a film gate and the image is projected onto a screen, by means of light from a conventional projector bulb, through an image magnifying optical system. The desired annotation is marked on the screen. The projector bulb is then turned off and a source of invisible radiation, such as a UV lamp, radiates from the opposite side of the screen through the screen and optical system onto the film and the secondary emulsion, thereby exposing the emulsion in accordance with the marks on the screen. After the emulsion is processed, the projected image of the film will contain the annotation as well as the original data.

The invention allows an almost immediate transfer of images to the secondary emulsion which can be adhered automatically to an existing opaque, translucent, or transparent film. The adhered emulsion can be removed without damage to the existing film so that erasures and/or further additions of data can be made as desired and with relatively short "turn-around" times.

Therefore, it is an object of the present invention to provide a film annotation method which is fast, easy, accurate and inexpensive to use.

Another object of the present invention is to provide a film annotation method which permits annotations which have already been added to a film to be removed without damaging the film.

A further object of the invention is to provide a system of film annotation capable of adding fine line work and a large amount of data to a piece of previously processed film.

Still another object of the present invention is to provide a film article which can be easily and quickly annotated and on which the annotations can be changed without damage to the film.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
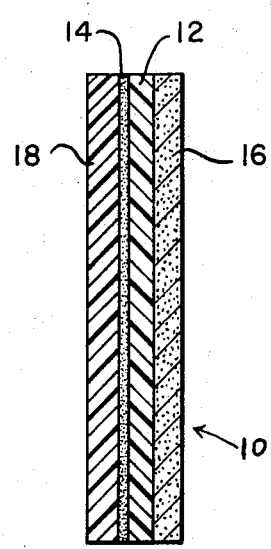
FIG. 1 shows the film article upon which annotation marks are made.

Referring now to FIG. 1, the numeral 10 designates the film article of the invention which can be annotated in the manner described above. The article 10 comprises a thin, light transmissive, membrane 12 of a material such as polyester upon which is coated, on one side, a photographic emulsion 16. The membrane is adhered to the base film 18 by means of a thin layer of standard adhesive 14. The base film 18 is the information containing film which is to be annotated. The emulsion 16 is not sensitive to light in the visible spectrum but is sensitive to some particular wavelength of invisible light. A preferred emulsion is one containing UV sensitive Diazo compounds which may be processed after exposure with simple gaseous ammonia processing equipment. An adhesive-backed Diazo emulsion on polyester which can be adhered to the base film is commercially available from Specialty Coatings, Inc., of Plymouth, Mich.

According to the invention, the secondary emulsion 16 and membrane 12 are adhered onto one surface of the film to be annotated by means of the adhesive 14. Since the secondary emulsion is not sensitive to visible light, the article 10 can be adhered to opaque, translucent or transparent film either prior to or after exposure and processing of the film. Since the membrane and secondary emulsion can be easily removed after use with no deleterious effects on the base film, the base film can be used and annotated as often as necessary.

Figure 2:
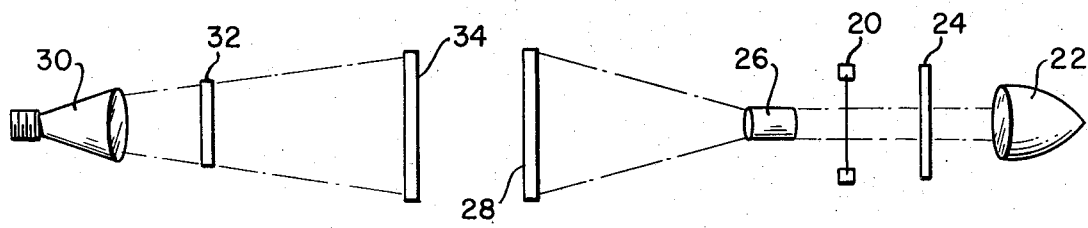
FIG. 2 shows the system by means of which the film article is annotated.

Referring now to FIG. 2, numeral 20 represents a film gate into which the base film with the adhered secondary emulsion is placed. A conventional projection light source 22 emits a light beam which passes through UV filter 24, film gate 20, and lens 26 to project an image of the film on screen 28. Disposed on the other side of the screen 28 is radiation source 30 capable of emitting substantial radiation in a particular wavelength lying without the visible spectrum. A diffusion lens 32 can be used to diffuse the radiation from source 30 before it passes through condensing lens 34 onto screen 28.

The system operates in a manner which will now be described. The film article 10 is placed in film gate 20 with the secondary emulsion facing the screen. The projection lamp 22 is turned on and the image is projected through the imaging lens 26. The lens should be uncoated so that it can pass maximum amounts of UV light with no fluorescing on the surfaces of the lens. UV filter 24 disposed between the projector lamp 22 and film gate 20 absorbs unwanted ultra-violet light transmitted from the projection bulb to prevent it from striking and exposing the Diazo emulsion during the projection step. The projected image appears on screen 28 which is preferably an image/scribing ground glass screen. The screen provides the function of recording the projected image and providing a surface for marking with a grease pencil or other marking device. Glass is the preferred material because it is a better transmitter of UV energy than other common and inexpensive screen materials, such as plastic or acrylic. The project image is viewed from the opposite or left side of the glass 28 and, at this time, hand scribed annotation data or information is scribed on the screen surface using the projected image as a reference. Since the annotation information is drawn with the original or base film in place, and no optical changes are required for the Diazo exposure step, positive registration is assured. When annotation scribing is completed, UV lamp 30, such as a mercury vapor flood lamp, is swung into place as shown in FIG. 2. The UV beam passes through diffusion lens 32 and condensing lens 34 onto screen 28 whereby the image of the annotation marks on the screen is projected back through the imaging lens onto the Diazo emulsion in registration with the information on the base film. The Diazo emulsion is thus exposed in accordance with the annotation marks on the screen 28. This method can be repeated as many times as needed to completely annotate a piece or frame of film. When the final frame annotation is completed, the film is processed in an ammonia vapor processor and the film article is ready for insertion in the projected data display system.

The invention permits the photographic transfer of drawings, graphic illustrations, alpha/numerics, printed and textual matter, hand drawn representations, etc. to existing and previously processed black and white or color films. It will allow this additional data to be added at any time and requires only a minimum of time for its' application. The data may be added to view-graphs, clear window films, on glass, mylar, acetate, polyester, or other plastic, or paper bases.

The device may also be used to photographically enlarge or reduce various copy sizes to other copy sizes, for example, large copy may be reduced to microfilm or microfiche or it may be used to enlarge stored microfilm, or microfiche data to original sized copy. Since enlargements and reductions may be made the original copy may be any convenient sized copy reduced in microfilm enlarged to original sized copy for "Paste ups," view graphs, or other hardcopy output.

As applied to military and commercial aircraft, the present invention permits the quick transfer of flight routing information with a great degree of fidelity to a color filmstrip. It permits the transfer of the flight information to be placed directly on the filmstrips which in turn is used in the PMDS to show precise position and as an aid to precision navigation and aircraft weapons delivery. Also a great deal of information which was incorporated on the filmstrip tended to become outdated. This new method allows outdated information to be stripped from the film and replaced with new and current data almost instantly.

Obviously, many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of annotating previously processed film comprising the steps of:

coating one side of a light transmissive membrane with an emulsion which is insensitive to visible radiation but is sensitive to a particular wavelength of invisible radiation;

adhering the film to be annotated to the other side of the membrane;

projecting an image of the film to be annotated onto a screen;

inscribing the annotations on the screen in registry with said image;

projecting an image of the inscribed annotations onto the emulsion by means of a radiation source of the same wavelength to which the emulsion is sensitive; and, processing said emulsion.

2. The method of claim 1 wherein said adhering step further comprises:

coating the other side of the membrane with a light transmissive adhesive; and, afixing the film to be annotated to the membrane by contacting said adhesive.

3. A method of annotating previously processed film comprising the steps of:

coating one side of a light transmissive membrane with an emulsion containing a Diazo compound;

adhering the film to be annotated to the other side of the membrane;

projecting an image of the film to be annotated onto a screen;

inscribing the annotations on the screen in registry with said image;

projecting an image of the inscribed annotations onto the Diazo compound emulsion by means of a source of ultraviolet light, whereby the emulsion is exposed according to the annotations; and, processing said emulsion.

4. Aparatus for annotating an article of film comprising:

a film gate means for securing a strip of film to which an emulsion sensitive to invisible light has been adhered;

a screen;

first illuminating means for the transmission of a beam of visible light through said film gate thereby illuminating the entire strip of film secured in said film gate means;

means for projecting an image of the entire illuminated film onto said screen; and second illuminating means for the transmission of invisible light onto said screen whereby annotations printed on said screen are projected onto said emulsion and exposed thereon.

5. The aparatus of claim 4 wherein said second illuminating means comprises a source of ultra-violet light.

* * * * *